(No Model.) 2 Sheets—Sheet 1.

W. B. CLEVELAND.
DYNAMO ELECTRIC MACHINE.

No. 284,277. Patented Sept. 4, 1883.

Witnesses.
W. G. Cleveland
Wm. K. Kidd

Inventor.
Wm. B. Cleveland
per. Thos. B. Hall.
Attorney.

(No Model.)  W. B. CLEVELAND.  2 Sheets—Sheet 2.
DYNAMO ELECTRIC MACHINE.

No. 284,277.  Patented Sept. 4, 1883.

Witnesses.
W. G. Cleveland.
Wm. K. Kidd

Inventor.
Wm. B. Cleveland
per Thos. B. Hall
Attorney.

UNITED STATES PATENT OFFICE.

WILLIAM B. CLEVELAND, OF CLEVELAND, OHIO.

DYNAMO-ELECTRIC MACHINE.

SPECIFICATION forming part of Letters Patent No. 284,277, dated September 4, 1883.

Application filed May 26, 1883. (No model.)

*To all whom it may concern:*

Be it known that I, WILLIAM B. CLEVELAND, a citizen of the United States, residing at Cleveland, county of Cuyahoga, and State of Ohio, have invented certain new and useful Improvements in Electric Machines; and I do hereby declare the following to be a description of the same and of the manner of constructing and using the invention in such full, clear, concise, and exact terms as to enable any person skilled in the art to which it appertains to construct and use the same, reference being had to the accompanying drawings, forming a part of the specification, the principle of the invention being herein explained, and the best mode in which I have contemplated applying that principle, so as to distinguish it from other inventions.

It may be stated at the outset that the several improvements herein set forth are applicable to machines adapted either for generating or utilizing electrical energy.

The primary object of my invention is to provide an improved form of armature, adapted to render the current of electricity prolonged and constant; a form of armature in which the current of electricity induced in each core under the action of each magnet may be gradual, both in its commencing and in its ending, said armature also being of such construction as to cause each core to be brought into position to be acted upon by each magnet to the full extent of the latter's power before the immediately-preceding core passes beyond the action of the same magnet. In addition to the foregoing, three other points have been had prominently in view: first, to cause the poles of the several armature-cores to have movement in close contiguity to the field-magnets; second, to so locate the cores in the armature and wind them in such manner that the lines of inductive force may pass through the sides of the coils, as well as through the extremities of the cores; third, to so form the coils that the space of the armature may be best utilized, and at the same time secure good ventilation thereof. With the above ends in view, and to the attainment thereof, I form a circular series of cores respectively placed obliquely to the plane of rotation of the armature, and severally provided with double conical coils.

Figure 1:
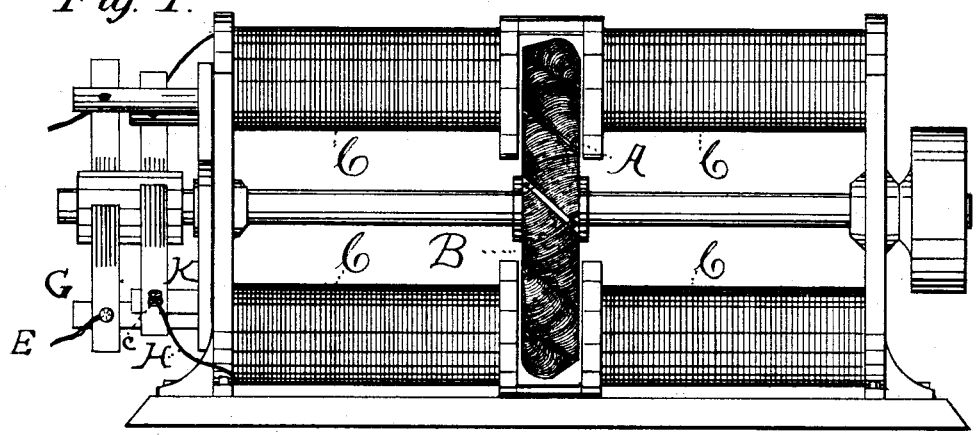
Figure 2:
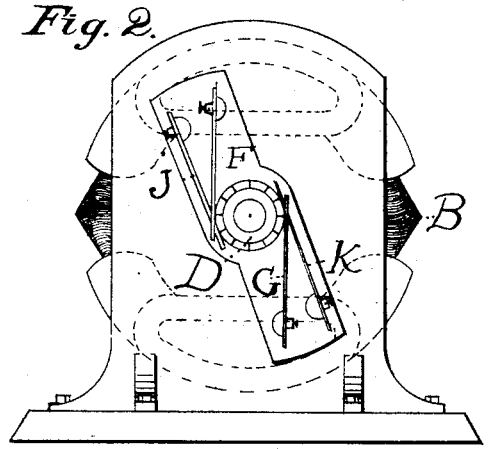
Figure 3:
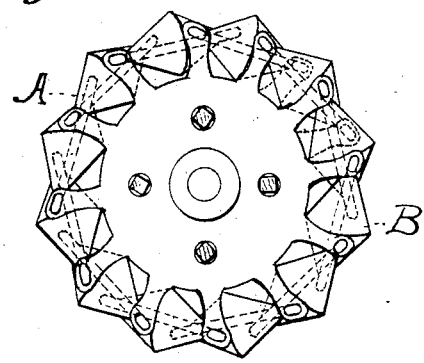
Figure 4:
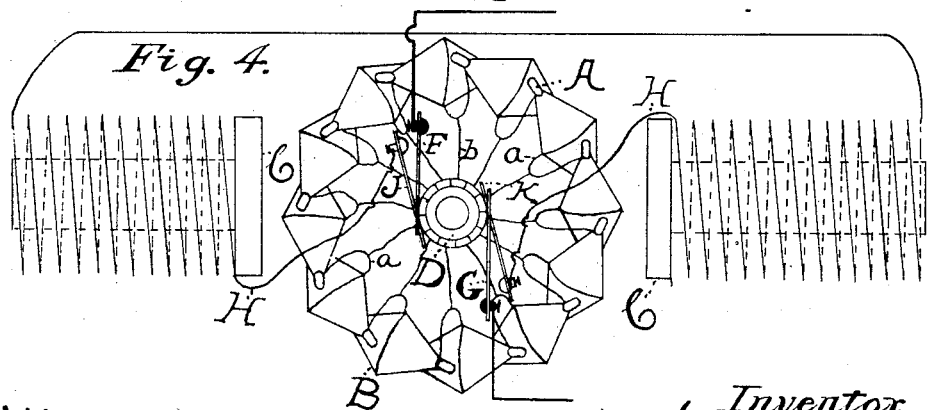
Figure 5:
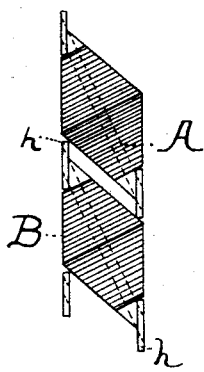
Figure 6:
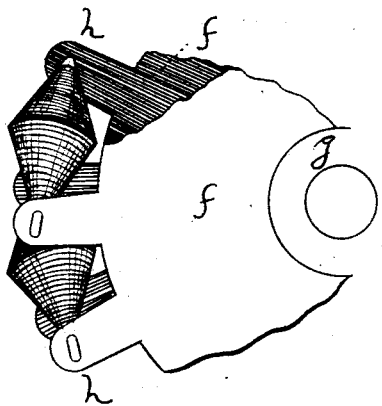
Figure 7:
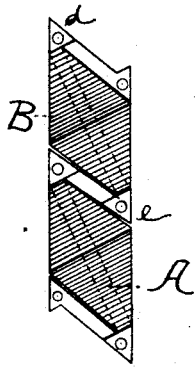
Figure 8:
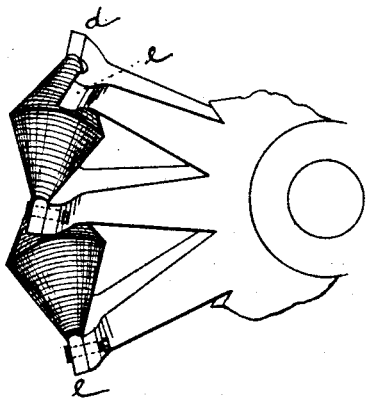

Reference now being had to the drawings, Figure 1 is a side elevation of a dynamo-electric machine provided with my improvements. Fig. 2 is an end elevation of the same. Fig. 3 is a detail view, representing in elevation one face of a modification of the form of armature shown in Fig. 1. Fig. 4 represents the manner of connecting the several coils together and to the collector, and also represents the manner of establishing a shunt-circuit, which may or may not be used, as desired. Fig. 5 is a view in edge elevation of a portion of the form of armature shown in Fig. 3. Fig. 6 is a face view of a portion of the same form of armature, having part of one side broken away. Fig. 7 is a view in edge elevation of a portion of the form of armature shown in Fig. 1. Fig. 8 is a face view of the same form of armature, having a portion broken away.

The armature is formed of a circular range of cores, A, provided with double conical coils B, said cores being respectively located at an oblique angle to the plane of rotation of the armature. Each core therefore has one of its ends located in advance of its opposite end, relative to the direction in which the core enters the field of action of each field-magnet C, though the core is individually located out of line with the plane of the armature, considered as an entirety. The cores may be severally placed at any desired inclination to the plane of the armature, though I prefer them placed substantially as indicated in the drawings. The field-magnets are respectively located with their axial length in transverse line with the armature, and on opposite sides of the latter. The faces of the poles of the armature-cores are exposed, and pass in front of and in close proximity to the faces of the field-magnet poles. As the armature revolves each core is successively brought into position to be subjected to the maximum inductive influence of each field-magnet before its immediately-preceding core is carried into a position beyond the inductive influence of said magnet. Hence the current of electricity is rendered more constant than would otherwise be the case. Each core is also brought gradually into the field of action of each field-magnet, and is gradually carried out of such field of action after having been acted upon to the full extent of the inductive influence of said magnet. This fact also tends to render the current continuous. The coils are made in double conical form, so that they may fit most closely together, in view of the quantity of wire employed. The several coils are connected together in consecutive order by loops $a$. Connecting-wires $b$ lead, respectively, from these loops to the several segments of the collector D. The external circuit, E, is provided with collecting-brushes F and G. The shunt-circuit H is provided with brushes J and K, said circuit passing through the field-magnets, which serve as a resistance. This circuit arrangement of parts, however, constitutes no part of my invention, and the latter is entirely independent of any special form of circuit.

Two forms of armature are shown in the drawings. The form represented in Figs. 1, 7, and 8 is a wheel whose spokes have their outer ends respectively provided with two arms—one arm, $d$, extending forwardly, and the other arm, $e$, extending rearwardly—the line connecting the two arms being at an oblique angle to the plane of the armature, considered as a whole. The forward ends of the cores are respectively supported by the forward arms of the spokes, and the rearward ends of the cores are respectively supported by the rearward arms of the spokes. The form of armature represented in Figs. 3, 5, and 6 consists of two disks, $f$, united to a hub, $g$, each disk being provided with arms $h$, formed substantially in the same plane therewith. These disks are maintained at a suitable distance apart from each other to permit of the cores being supported obliquely between the arms of the two. Both forms of armature are adapted to support the poles of the cores in close contiguity with the poles of the field-magnets as the armature revolves.

It is apparent that lines of force from the field-magnets may enter the sides of the coils, and thus pass to the cores, in addition to such lines of force as strike the cores at their poles or exposed extremities.

It will also be observed that good and ample ventilation is secured in the armature under the arrangement of cores and construction of coils as described.

In describing my invention I have herein merely illustrated the principles thereof under the forms shown. It is apparent, however, that it is as applicable to magneto-electric machines as to dynamo-electric machines. So, too, it is as applicable to electric motors as to electric generators. As regards the mode of connecting the coils together and to the collector, I have merely adopted the ordinary form of connecting without restricting myself thereto; and I desire to be understood that changes to any extent in the forms of construction and operation herein shown may be made, provided the principles of invention set forth in the following claims are retained.

I therefore particularly point out and distinctly claim as my invention—

1. In an electric machine, the combination, with an armature having a series of coils respectively located obliquely to its rotating plane, of field-magnets respectively located with their axial length in transverse line with the armature, substantially as set forth.

2. In an electric machine, the combination, with field-magnets, of an armature provided with a series of cores respectively located obliquely to its rotating plane, said cores having the faces of their poles exposed to the action of the field-magnet poles, and adapted to pass in front of and in close proximity to the same, substantially as set forth.

3. In an armature of an electric machine, a series of coils each having its extremities formed of less diameter than its central body portion, said coils being fitted together, respectively, at an inclination to the plane of the armature, substantially as set forth.

4. In an armature of an electric machine, a circular series of double conical coils severally inclined to the plane of rotation of the armature, the forward cone of each coil fitting next to the rearward cone of the immediately-preceding coil, substantially as set forth.

5. In an electric machine, a revolving armature constructed with spokes having their outer ends respectively provided with two arms, one extending forward and the other extending rearward, the forward arm of any one spoke supporting the forward end of one core and the rearward arm of the same spoke supporting the rearward end of the next preceding core, substantially as set forth.

In testimony that I claim the foregoing to be my invention I have hereunto set my hand this 23d day of May, A. D. 1883.

WILLIAM B. CLEVELAND.

Witnesses:
THOS. B. HALL,
W. G. CLEVELAND.